United States Patent
Bamberger (10) Patent No.: US 9,929,562 B2
(45) Date of Patent: Mar. 27, 2018

(54) METHOD AND APPARATUS FOR PREVENTING VOLTAGE FLICKER IN A POWER SYSTEM

(71) Applicant: RENEWABLE ENERGY SYSTEMS AMERICAS INC., Broomfield, CO (US)

(72) Inventor: Alex Bamberger, Boulder, CO (US)

(73) Assignee: RENEWABLE ENERGY SYSTEMS LTD. (GB)

( * ) Notice: Subject to any disclaimer, the term of this patent is extended or adjusted under 35 U.S.C. 154(b) by 169 days.

(21) Appl. No.: 15/177,233

(22) Filed: Jun. 8, 2016

(65) Prior Publication Data

US 2016/0365726 A1    Dec. 15, 2016

Related U.S. Application Data

(60) Provisional application No. 62/173,106, filed on Jun. 9, 2015.

(51) Int. Cl.
*H02J 3/00* (2006.01)
*H02J 7/00* (2006.01)

(52) U.S. Cl.
CPC .............. *H02J 3/00* (2013.01); *H02J 7/0068* (2013.01); *H02J 2003/002* (2013.01); *Y02P 80/23* (2015.11)

(58) Field of Classification Search
None
See application file for complete search history.

(56) References Cited

U.S. PATENT DOCUMENTS

| | | | |
|---|---|---|---|
| 5,818,208 A | 10/1998 | Othman | |
| 2013/0158918 A1* | 6/2013 | Spanier | G01R 22/10 702/64 |
| 2013/0162049 A1 | 6/2013 | Morati et al. | |

FOREIGN PATENT DOCUMENTS

| | | |
|---|---|---|
| CN | 101571563 B | 8/2011 |
| CN | 103050985 A | 4/2013 |
| WO | 2014/138896 A1 | 9/2014 |

OTHER PUBLICATIONS

PCT International Search Report, PCT/US2016/036507, dated Sep. 13, 2016, 2 pages.
Andrus, White Paper: "Understanding IEEE Flicker, Ifl, Pst, Pit", https://images.powermonitors.com/white-papers/WP104, Jan. 2013, 5 pages.

* cited by examiner

*Primary Examiner* — Jared Fureman
*Assistant Examiner* — Aqeel Bukhari
(74) *Attorney, Agent, or Firm* — Innovation Counsel LLP (57) ABSTRACT

A method mitigates or prevents voltage flicker in an electrical power system that includes at least one power generating, energy storing, or power dissipating facility connected to a power grid and a controller connected to the facility. The method includes receiving in the controller a power value at a present time t and a power value at time t+T or at time t-T to determine a power change of the facility, calculating a voltage flicker impact on the power grid of the power change, determining if the flicker impact of the power change is above a limit, and sending a control signal from the controller to the facility when the flicker impact of the power change is above the limit to adjust the facility.

20 Claims, 5 Drawing Sheets

Figure 1 — Flicker tolerance curve from IEEE std 141-1993/IEEE Std 519-1992

METHOD AND APPARATUS FOR PREVENTING VOLTAGE FLICKER IN A POWER SYSTEM

CROSS REFERENCE TO RELATED APPLICATIONS

This application claims benefit of priority to U.S. Provisional Patent Application No. 62/173,106 titled "Method and Apparatus for Preventing Voltage Flicker in a Power System" and filed Jun. 9, 2015, which is incorporated herein by reference in its entirety.

FIELD OF THE INVENTION

The invention relates generally to a method and apparatus for mitigating and preventing voltage flicker in an electrical power system.

BACKGROUND

Electric power is supplied to homes and industries through the electrical power system. The electrical power system is an interconnected network that includes power generating plants that produce electrical power, high-voltage transmission lines that carry power from distant sources to demand centers, and distribution lines that supply individual users with electricity. The transmission and distribution lines of the power system, or portions thereof, are often referred to as the grid, or power grid.

For electrical devices receiving electricity from the power system to function properly, the voltage of the electricity supplied by the power system must be of high quality. Voltage fluctuations, which are rapid and noticeable changes in the root mean square (rms) voltage level of the electricity supplied by the power system, can degrade the power quality and affect the performance of electrical devices. For instance, the effect of such voltage fluctuations can be perceived in visible changes of the brightness of a lamp, causing the light level of the lamp to fluctuate, or flicker. Thus, the term "flicker" or "voltage flicker" is often used to refer to such voltage fluctuations. Voltage flicker can be caused by a fluctuating electric load when various equipment or facilities change the load current on, for instance, the distribution level of the grid of the power system.

Figure 1:
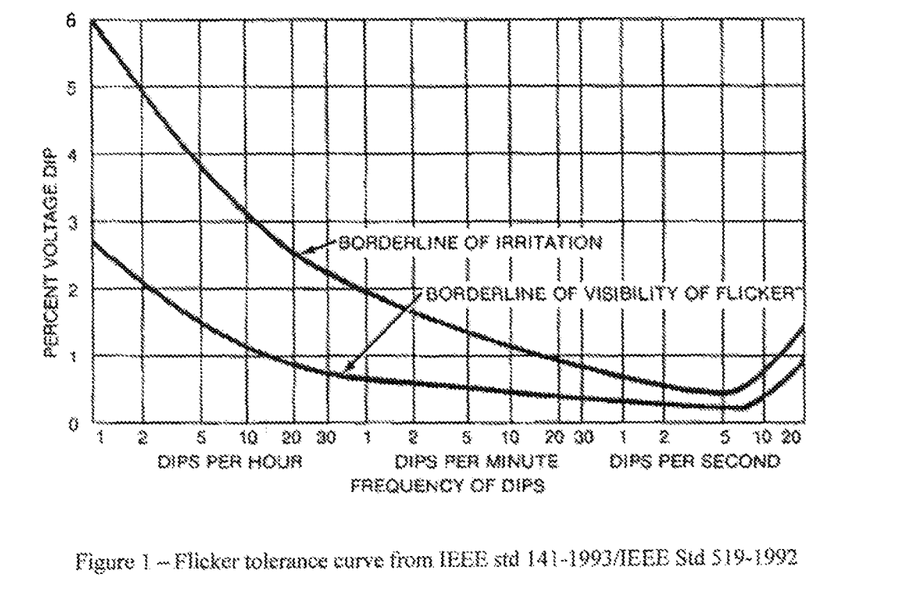
FIG. 1 is a voltage flicker tolerance curve from IEEE Standard 141-1993/IEEE Standard 519-1992.

Regulators establish guidelines, or limits, for the maximum acceptable levels of voltage flicker that can be tolerated by customer electronic devices receiving electricity through the power system. One such guideline is shown in FIG. 1, which is a voltage flicker tolerance curve from the IEEE Standard 141-1993/IEEE Standard 519-1992, known as the "GE Flicker Curve." The GE Flicker Curve shows the point at which, for a given size and frequency of a voltage fluctuation (referred to as a dip), a typical person begins to perceive visible flicker in the brightness of a lamp, and the point at which a typical person would become irritated by such visible flicker.

When new facilities are installed on the electrical power system, or other changes that may affect the voltage levels are made to the electrical power system, such changes are evaluated for their impact on voltage flicker. The voltage flicker caused by such new facility installations or other changes typically must be within the acceptable levels set by regulators, for instance under the levels determined by the GE Flicker Curve. If the voltage flicker exceeds the flicker limits, costly equipment is often required to be added to the facility to bring the voltage flicker within acceptable levels.

SUMMARY

A method for mitigating voltage flicker in an electrical power system is provided. The electrical power system includes at least one power generating, energy storing, or power dissipating (load) facility connected to a power grid and a controller connected to the facility. The controller is configured to receive input signals from the facility, and to send control signals to the facility. The method includes measuring a value $V_d$, which is a percent voltage dip caused in the power grid for a maximum change in power of the facility, $M_s$; receiving and storing in the controller the value $V_d$, the value $M_s$, a time interval T, and a voltage flicker tolerance curve; receiving in the controller a power value at time t and a power value at time t+T or at time t−T to determine a power change of the facility; calculating, for the power change of the facility, a flicker impact of the power change using the values of $V_d$, T, and Ms and the voltage flicker tolerance curve stored in the controller; determining if the flicker impact of the power change causes the facility to exceed a flicker limit; and sending a control signal from the controller to the facility when the flicker impact of the power change is above the limit to adjust the facility.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several example embodiments, adaptations, variations, alternative and uses of the invention.

Figure 2:
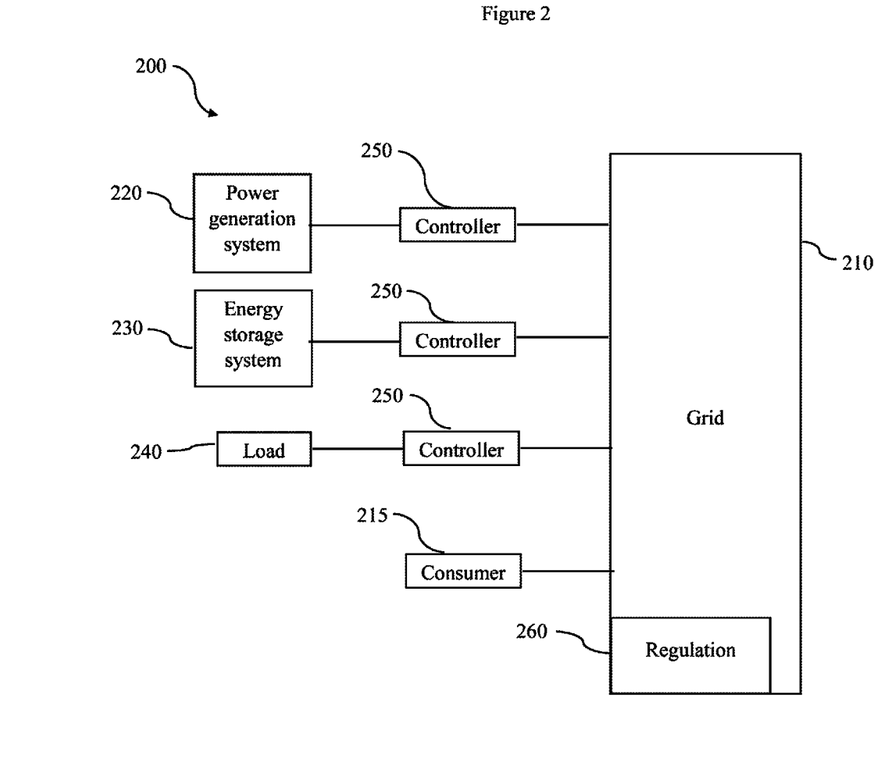
FIG. 2 shows an electrical power system with facilities coupled to a grid.

This specification discloses a method and apparatus for mitigating or preventing voltage flicker in an electrical power system. FIG. 2 shows an example of an electrical power system 200. Electrical power system 200 includes, for example, an electrical power generation system 220, an energy storage system 230, a consumer 215, and a power dissipating (consuming) load 240 each connected to a grid 210. The power generation system 220, the energy storage system 230 and the load 240 are collectively referred to as facilities, each a facility. An electrical power system 200 may include numerous different types and numbers of facilities.

The power generation system 220 supplies the electrical power system with electricity and may be, for example, a fossil fuel burning plant, such as a coal burning plant, or a renewable energy installation, such as a wind farm or a solar energy installation.

The energy storage system 230 is supplied with and stores power from the power generation system 220, and provides the stored power to the consumer 215 and the load 240. The energy storage system 230 may be, for example, a battery energy storage system (BESS). Within the electrical power system 200, at any time, the power generated by the power generation system 220 may exceed the power needed by the consumer 215 and the load 240, particularly in the cases where wind farms and solar installations generate the power. Having energy storage system 230 connected to the grid 210 can reduce these inefficiencies by providing a mechanism to store surplus power generation so that consistent power can be provided.

The consumer 215 and load 240 both receive electrical power from the electrical power system 200. The consumer may represent a variety of homes and businesses. The load 240 may, for example, represent a particular industrial use of electrical power that is large enough to have a noticeable effect on the electrical power system 200.

The grid 210 may include high-voltage transmission lines and/or lower voltage distribution lines that conduct electricity provided by the power generation system 220 to the consumer 215, the load 240, and the energy storage system 230. The high-voltage transmission lines and/or lower voltage distribution lines of the grid 210 also conduct electricity from the energy storage system 230 to the consumer 215 and the load 240.

The grid 210 includes a regulation system 260 for ensuring that power is flowing smoothly through the grid 210. The regulation system 260 also ensures that power generated by the power generation system 220 and stored in the energy storage system 230 is provided as needed to the consumer 215 and load 240.

FIG. 2 also shows voltage management controllers 250 that prevent the facility to which they are connected from causing voltage flicker. Voltage management controllers 250 are connected, for example, between the grid 210 and each of the power generation system 220, the energy storage system 230, and the load 240, and prevent the components of the electrical power system 200 to which it is connected from causing voltage flicker. The method disclosed herein for mitigating or preventing voltage flicker may be performed by a voltage management controller 250. More details of the voltage management controller 250 will be described below.

Figure 3:
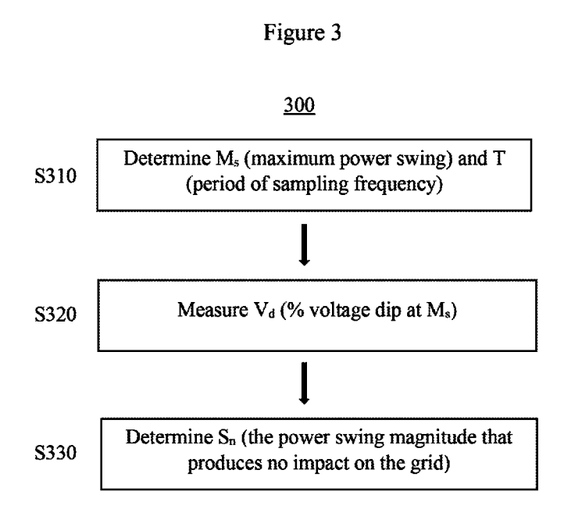
FIG. 3 shows a set-up portion of a method for preventing voltage flicker.

FIG. 3 shows an initial set-up portion 300 of the method for preventing voltage flicker. In the initial set-up portion 300 of the method for preventing flicker, values of parameters are determined for the particular facility connected to grid 210. The values of the parameters are then input and stored in the controller 250 for the facility and used in the real-time portion of the method for preventing flicker. The parameters determined are the maximum power swing for the facility, $M_s$ the time interval, T, the percent voltage dip, $V_d$, that would occur in the grid 210 for a full cycle of a maximum power swing $M_s$, and the swing magnitude, $S_n$, that would produce no impact on the grid 210.

At step S310 of the method, for the particular facility connected to grid 210, the values of the maximum power swing, $M_s$, in MW, and the time interval, T, in seconds, are determined.

In general, the maximum power swing $M_s$ is the largest power change the facility is capable of. For example, if the facility is a battery used for an energy storage system 230, the maximum power swing $M_s$ is the power change from full charge to full discharge. If, for example, the facility is a solar installation used for a power generation system 230, the maximum power swing $M_s$ is the AC capacity of the solar installation. If, for example, the facility is a load 240, the maximum power swing $M_s$ is the peak draw of the load.

In general, the time interval T is the minimum amount of time a ramp event (power change) will take to occur. For example, if the facility is a battery used for an energy storage system 230, the time interval T can be the period of the interval between the regulatory signals that provide the battery with new power set points. The power set point is the amount of power the grid regulation system 260 determines the energy storage system 230 needs to provide to the electrical power system 200 at a given time. The regulation system 260 sends new power set points at a regular frequency, which corresponds to the time interval T for method 300. If, for example, the facility is a solar installation used for a power generation system 230 that inputs power to the power system 200, the time interval T may be the discrete time step which represents the minimal amount of time over which a large power deviation input to the power system 200 would occur, or T may be a test/sampling time step set by regulation system 260. If, for example, the facility is a load 240 that draws power from the power system 200, the time interval T may be the discrete time step which represents the minimal amount of time over which a large power deviation pulled off the power system 200 would occur, or T may be a test/sampling time step set by regulation system.

At step S320, for the particular facility connected to grid 210, the percent voltage dip $V_d$ that would occur in the grid 210 for a full cycle of a maximum power swing $M_s$ is measured for that facility. Methods for measuring such percent voltage dip $V_d$ are known to persons having ordinary skill in the art, and such measurements may be made as part of a transmission study and/or interconnection study performed by regulators when the facility is connected to the power system 200.

Referring again to FIG. 3, at S330 the values of $M_s$, T, and $V_d$ are used along with the GE Flicker Curve (FIG. 1) to determine the maximum swing magnitude $S_n$ that would produce no impact on the grid 210. That is, for the given $M_s$, T, and $V_d$ of the particular facility, the largest power change the facility can make without producing a voltage flicker in grid 210 is determined. Equation 1 provides $S_n$:

$$S_n = \frac{PVD\left(\frac{3600}{T}\right)}{V_d} * M_s \qquad \text{Equation 1}$$

where PVD(x) is the percent voltage dip as a function of the dips per hour (i.e., 3600/T where T has unit seconds) at the borderline of visibility for flicker, which is determined for example from the GE Flicker Curve. While the GE Flicker Curve is used herein as an example standard for setting the limits of acceptable voltage flicker, any other method for setting a limit of PVD(x) may be used. The method ensures that the impact of any facility on the grid 210 will not exceed the limits set by the standard used.

Once the values of $M_s$, T, $V_d$ and $S_n$ are known, they can be used in the real-time portion of the method for preventing flicker. The method for preventing flicker uses Equation 2, below, to determine the flicker impact $F_i$ caused by a power change $\Delta P$ of the facility:

$$F_i = \frac{1}{DPH\left(\frac{\text{abs}(\Delta P)}{M_S} * V_d\right)} \quad \text{Equation 2}$$

In this equation $$\left(\frac{\text{abs}(\Delta P)}{M_S} * V_d\right)$$

is the percent voltage dip resulting from the power change $\Delta P$, and DPH(x) is the maximum number of dips per hour of that magnitude that are allowed if the facility is to stay within the borderline of visibility for flicker. DPH(x) is determined for example from the GE Flicker Curve (FIG. 1). For example, if the power change is the maximum power swing $M_s$, the maximum number of dips per hour that are allowed is DPH($V_d$), which may be read from the GE Flicker Curve at percent voltage dip=$V_d$. As noted above, while the GE Flicker Curve is used herein as an example standard for setting the limits of acceptable voltage flicker, any other flicker tolerance curve for setting a limit of DPH(x) may be used.

How the power change $\Delta P$ is determined in Equation 2 depends on the particular type of facility, and the adjustment made to the power system based on the results of the flicker impact also depends on the particular facility. Thus, application of Equation 2 to an energy storage system 230 such as a BESS, a power generation system 220, such as a solar installation, and a load 240, such as an industrial application, will be described in turn below.

Figure 4:
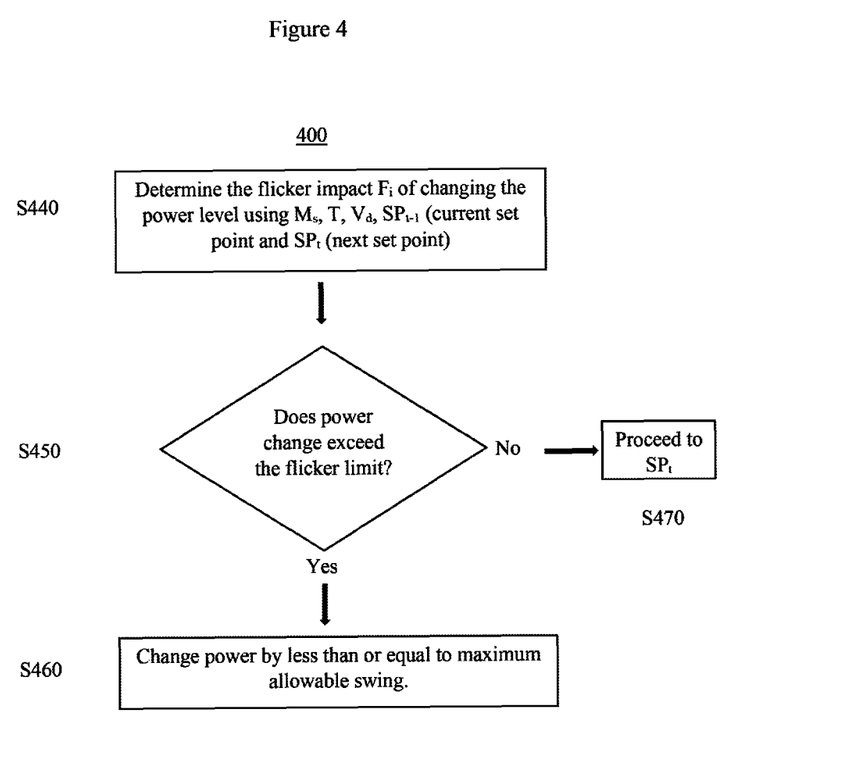
FIG. 4 shows a real-time portion of a method for preventing voltage flicker in an energy storage system.

FIG. 4 shows the real time portion of the method for preventing flicker 400 as used for an energy storage system facility 230. When an energy storage system 230, such as a BESS, is connected to grid 210, the regulation system 260 sends power level requests to the energy storage system 230 at time intervals T. That is, as the regulation system 260 for the electrical power system 200 determines that more or less power is needed by consumer 215 and/or load 240, the amount of power output from the energy storage facility 230 is changed. Each new power level request provides a new set point for the output of the energy storage system 230. When the new power level request set point $SP_t$ is received, the real time portion of the method 400 in FIG. 4 is performed.

At step S440 of the method of FIG. 4, the flicker impact of changing the power output level to the next requested set point is determined. The values of $M_s$, T, $V_d$, $S_n$, $SP_{t-1}$ (current set point) and $SP_t$ (next set point) are input into Equation 3 below. Equation 3 is just Equation 2, described above, with $\Delta P$ determined by the set point values: $\Delta P = SP_t - SP_{t-1}$. Thus, in Equation 3, the percentage voltage dip is determined by the absolute value of the change in the set points abs($SP_t - SP_{t-1}$). The input values are then used at step S440 in Equation 3 to calculate the flicker impact of moving to the next set point:

$$F_i = \frac{1}{DPH\left(\frac{\text{abs}(SP_t - SP_{t-1})}{M_S} * V_d\right)} \quad \text{Equation 3}$$

In Equation 3 DPH(x) is the maximum number of dips per hour that are allowed if the facility is to stay within the borderline of visibility for flicker, as determined from the GE Flicker Curve for example, for the percent voltage dip resulting from the power change $\Delta P$ arising from changing the power to the new set point.

Once the flicker impact of changing the power output level of the energy storage system to the next requested set point is determined, at step S450 it is determined whether or not moving to the next set point exceeds the flicker limit. As shown in Equation 2 and Equation 3 and described above, the flicker impact of any given voltage dip is equal to the inverse of the maximum number of voltage dips of that magnitude that are allowed per hour if the facility is to stay within the borderline of visibility for flicker. Hence Equation 2 and Equation 3 can be rewritten as shown below in Equation 4:

$$F_i(d_h) = d_h^{-1} \quad \text{Equation 4}$$

where $d_h$ is the dips per hour allowed for any given voltage swing in question. The maximum cumulative rolling hour flicker impact is shown in Equation 5:

$$F_i(d_h) * d_h = d_h^{-1} * d_h = 1 \quad \text{Equation 5}$$

The method uses the dimensionless flicker limit of 1 as shown in Equation 5 and determines if the accumulated flicker impact from the facility's previous rolling hour of operation plus the impact from the next set point exceeds this limit. Referring again to FIG. 4, in step S450, the method checks if moving to the next set point will exceed the flicker limit using Equation 6:

$$F_{i_t} + \sum_{t=t-1hr}^{t=t-1} F_{i_t} < 1 \quad \text{Equation 6}$$

The left side of Equation 6 adds the flicker impact of the power change $\Delta P$ of the facility to the flicker impacts of all other power changes of the facility that occurred in the hour previous to time t. As shown in step S460, if Equation 6 is true, then the flicker limit will not be exceeded, and the change to the new set point can proceed. If, on the other hand, Equation 6 is not true (S470), then the power output is moved in the direction of the proposed set point by the magnitude of the swing that would produce no impact on the grid 210, as shown in Equation 7:

$$SP = SP_{t-1} + \frac{SP_t - SP_{t-1}}{\text{abs}(SP_t - SP_{t-1})} * S_n \quad \text{Equation 7}$$

where SP is the adjusted set point for the new power output level that will produce no impact on the grid 210 and will be used instead of the requested set point $SP_t$ for which the power level output change would exceed the flicker limit.

Although Equation 6 sums flicker impacts over a one hour period, Equation 6 may instead be recast to add the flicker impact of the power change $\Delta P$ of the facility to the flicker impacts of all other power changes of the facility that occurred over any other suitable predetermined time period. In such cases the flicker impact used in the recast equation is defined as the inverse of the maximum number of voltage dips of a given magnitude that are allowed per such predetermined time period. Any suitable predetermined time period may be used to define flicker impacts and in Equation 6 to test whether or not the flicker impact of a power change ΔP causes the facility to exceed a flicker limit.

In the example shown in FIG. 4, the facility is an energy storage system 230. However, the method may be applied to other facilities as well.

If the facility is a power generation system 220, such as a solar installation, the method can be applied as follows. The power output by a power generation system 220, such as a solar installation, may be subject to fluctuations. For example, the power generated by a solar installation depends upon the amount of sunlight received by the solar panels. If there are sudden changes in the sunlight, for example, if there are clouds blowing across the solar installation that block or partially block the sunlight, the solar installation will, during that time period, produce less power. If the power produced by the power generation system 220 is output directly to the grid 210, such sudden changes can cause voltage flicker. Equation 8 below determines the flicker impact due to power changes for interval T. While the energy storage system 230 described above receives set points and determines the flicker impact for a new set point before proceeding to provide power at the next set point, the method applied to the power generation system 220 uses, as shown in Equation 8, the actual power provided.

$$F_i = \frac{1}{DPH\left(\frac{\text{abs}(Pout_t - Pout_{t-T})}{M_S} * V_d\right)} \quad \text{Equation 8}$$

In Equation 8, $\Delta P = Pout_t - Pout_{t-T}$, where $Pout_t$ is the power output at time t and $Pout_{t-T}$ is the previous power output.

Once the flicker impact $F_i$ is determined, it is used with Equation 6 above to determine if the power output level has exceeded or is close to the flicker limit. If so, then adjustments can be made to the power generation system.

Figure 5:
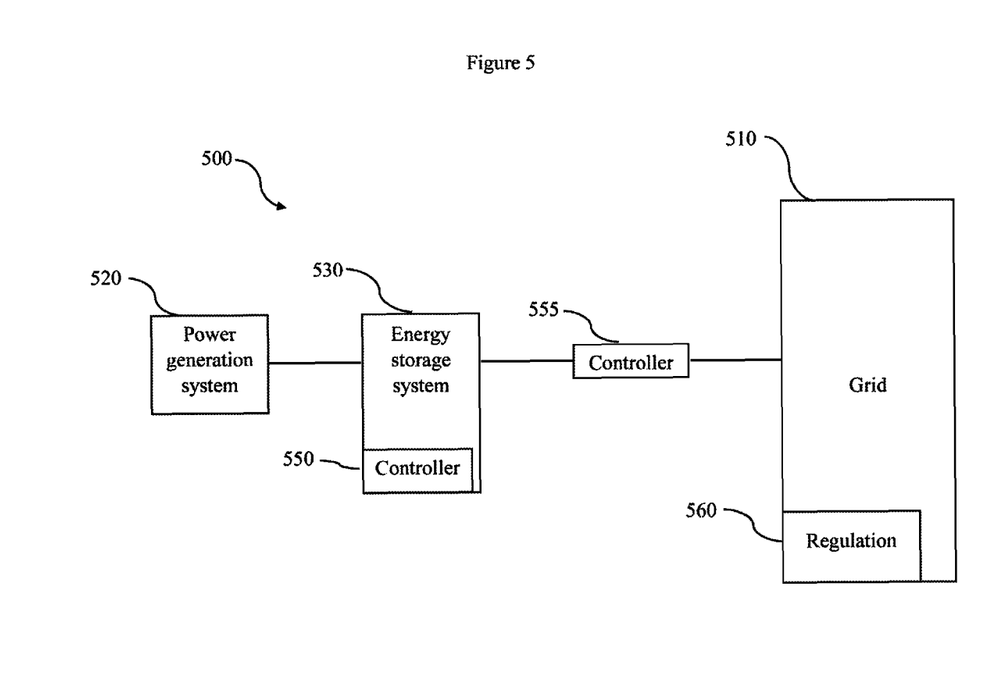
FIG. 5 shows an electrical power system with an energy storage system connected between a power generation system and the grid.

One method for adjusting based on the flicker impact $F_i$ determination is shown in FIG. 5. FIG. 5 illustrates an electrical power system 500. In FIG. 5, the power generation system 520 is, for example, a solar or wind energy generation system and the energy storage system 530 is, for example, a BESS. The energy storage system is connected between the grid 510 and the power generation system 520 in order to regulate the impact of the power generation system 520 on the grid 510. Thus, the energy storage system 530 receives the solar or wind energy and may be tightly looped with the power generation system 520 to determine if the power produced in the power generation system 520 can be put into the grid 510 in real time. If, using Equation 6 and Equation 8, as described above, in controller 550, it is determined that the flicker limit is not exceeded, then the power produced by power generation system 550 would simply pass through to the grid 510. Otherwise, if the flicker limit is exceeded, the energy storage system 530 would intervene and store excess power produced in the power generation system 520 or interject excess power into the grid 510. Power interjected into the grid 510 from the energy storage system 530 is under the control of the controller 555 which uses Equation 3, Equation 6, and the method described above. Thus, the energy storage system 530 absorbs or injects energy such that the sum of the power from the power generation system 520 and the energy storage system 530 does not exceed the flicker limit. The regulation system 560 may be notified. In conventional methods for managing power, power generation from, for example, a solar or wind energy generation system, is not input into the grid in real time, but the method describe above may allow for real-time input of the power.

In another example, the method can be used with a load 240. In this case, as shown in Equation 9, the flicker impact is determined for power changes in the amount of power removed from the grid 210, and $\Delta P = Pin_t - Pin_{t-T}$ where $Pin_t$ is the power load 240 draws from the grid 210 at time t, and $Pin_{t-T}$ is the amount of power drawn from grid 210 at the prior interval time t–T.

$$F_i = \frac{1}{DPH\left(\frac{\text{abs}(Pin_t - Pin_{t-T})}{M_S} * V_d\right)} \quad \text{Equation 9}$$

The flicker impact determined for load 240 at time t is then used with Equation 6 above to determine if the power drawn from the grid 210 has exceeded the flicker limit. If so, then adjustments can be made such as by using an energy storage system between the load 240 and grid 210 similar to what is described above with respect to the power generation system, except that the energy storage system provides energy directly to the load 240 if the flicker limit is exceeded.

A controller may be used to implement the method for preventing flicker. Referring to FIG. 2, the controllers 250 which implement the method are connected to both the regulation system 260 for the grid 210 and to the controls of the facility (220, 230, 240) to which the controller 250 is attached. The $M_s$, T, $V_d$ and $S_n$ information is input into, and may be stored in, the controller 250. The controller also stores the data in the GE Flicker Curve, or other flicker tolerance curve used to set the limits on voltage flicker. The controller 250 is configured to receive power information for the facility. For instance, for the energy storage system 230, the controller receives the power set point information from the regulatory system 260. Using the inputted $M_s$, T, $V_d$, and $S_n$ values, and the received power information along with the GE Flicker Curve, controller 250 performs the method for preventing voltage flicker. The controller 250 then signals the facility (220, 230, 240) to adjust as determined by the method. For instance, if the facility is an energy storage system and the new set point will not exceed the flicker limit, then the controller 250 provides the new set point to the energy storage system 230.

The controller 250 may be implemented as a separate unit at the facility connected to the regulation system 260 and the controls for the facility, as shown in FIG. 2, or controller 250 may be connected only to the facility (220, 230, 240). Alternatively, controller 250 may be implemented through a SCADA system (supervisory control and data acquisition system), for example, and provide signals to a remote facility from a more centralized control system (not shown in FIG. 2).

This disclosure is illustrative and not limiting. Further modifications will be apparent to one skilled in the art in light of this disclosure and are intended to fall within the scope of the appended claims.

What is claimed is:

1. A method for mitigating or preventing voltage flicker in an electrical power system, the electrical power system including at least one power generating, energy storing, or power dissipating facility connected to a power grid and a controller connected to the facility, the controller configured to receive input signals from the facility, and to send control signals to the facility, the method comprising:

receiving and storing in the controller a value $M_s$ which is a maximum change in power of the facility, a value $V_d$ which is a percent voltage dip caused in the power grid by the maximum change in power of the facility, a time interval T, and a voltage flicker tolerance curve;

receiving in the controller a power value at time t and a power value at time t+T or at time t−T to determine a power change ΔP of the facility;

calculating a flicker impact $F_i$ for the power change ΔP of the facility using the values of $V_d$, T, and $M_s$ and the voltage flicker tolerance curve stored in the controller;

determining if the flicker impact $F_i$ of the power change ΔP of the facility causes the facility to exceed a flicker limit; and sending a control signal from the controller to the facility to adjust the facility if the flicker impact of the power change ΔP of the facility causes the facility to exceed the flicker limit.

2. The method of claim 1, wherein calculating the flicker impact of the power change ΔP of the facility uses the following Equation I:

$$F_i = \frac{1}{DPH\left(\frac{abs(\Delta P)}{M_S} * V_d\right)} \qquad \text{Equation I}$$

where DPH(x) is a number of voltage dips per hour that are allowed based on a percent voltage dip as determined by ΔP, $M_s$ and $V_d$ to stay within the borderline of visibility for voltage flicker as determined from the voltage flicker tolerance curve stored in the controller.

3. The method of claim 2, wherein determining if the flicker impact of the power change ΔP of the facility causes the facility to exceed the flicker limit is performed by determining if Equation VI is false:

$$F_{i_t} + \sum_{t=t-1\,hr}^{t=t-1} F_{i_t} < 1 \qquad \text{Equation VI}$$

where the left side of Equation VI adds the flicker impact of the power change ΔP of the facility to the flicker impacts of all other power changes of the facility that occurred in the in the hour previous to time t.

4. The method of claim 3, wherein the electrical power system further includes a regulation system and the controller is connected to the power grid and receives power set point values from the regulation system at intervals set by the time interval T, and the power change ΔP is set by Equation VII:

$$\Delta P = SP_t - SP_{t-1} \qquad \text{Equation VII}$$

where $SP_t$ is a new set point value and $SP_{t-1}$ is the previously performed setpoint.

5. The method of claim 4, wherein the facility is an energy storage system, and if the flicker impact of the power change ΔP of the energy storage system causes the energy storage system to exceed the flicker limit the controller determines an adjusted set point value using Equation VIII:

$$SP = SP_{t-1} + \frac{SP_t - SP_{t-1}}{abs(SP_t - SP_{t-1})} * S_n \qquad \text{Equation VIII}$$

where SP is the adjusted set point value and $S_n$ is the largest power change the energy storage system can make in time interval T without producing an impact on the power grid, and $S_n$ is determined by Equation IX:

$$S_n = \frac{PVD\left(\frac{3600}{T}\right)}{V_d} * M_s \qquad \text{Equation IX}$$

where PVD(x) is a percent voltage dip as a function of a number of dips per hour (3600/T) at the borderline of visibility for flicker, determined from the voltage flicker tolerance curve, and the controller provides the adjusted set point value to the energy storage system with the control signal.

6. The method of claim 1, wherein determining if the flicker impact of the power change ΔP of the facility causes the facility to exceed the flicker limit is performed by determining if Equation II is false:

$$F_{i_t} + \sum_{t=t-1\,hr}^{t=t-1} F_{i_t} < 1 \qquad \text{Equation II}$$

where the left side of Equation II adds the flicker impact of the power change ΔP of the facility to the flicker impacts of all other power changes of the facility that occurred in the hour previous to time t.

7. The method of claim 1, wherein the electrical power system further includes a regulation system and the controller is connected to the power grid and receives power set point values from the regulation system at intervals set by the time interval T, and the power change ΔP is set by Equation III:

$$\Delta P = SP_t - SP_{t-1} \qquad \text{Equation III}$$

where $SP_t$ is a new set point value and $SP_{t-1}$ is the previously performed setpoint.

8. The method of claim 7, wherein the facility is an energy storage system, and if the flicker impact of the power change ΔP of the energy storage system causes the energy storage system to exceed the flicker limit the controller determines an adjusted set point value using Equation IV:

$$SP = SP_{t-1} + \frac{SP_t - SP_{t-1}}{abs(SP_t - SP_{t-1})} * S_n \qquad \text{Equation IV}$$

where SP is the adjusted set point value and $S_n$ is the largest power change the energy storage system can make in time interval T without producing an impact on the power grid, and $S_n$ is determined by Equation V:

$$S_n = \frac{PVD\left(\frac{3600}{T}\right)}{V_d} * M_s \qquad \text{Equation V}$$

where PVD(x) is a percent voltage dip as a function of a number of dips per hour (3600/T) at the borderline of visibility for flicker, determined from the voltage flicker tolerance curve, and the controller provides the adjusted set point value to the energy storage system with the control signal.

9. The method of claim 1, wherein the facility is a power generating system and the power change ΔP is set by Equation X:

$$\Delta P = Pout_t - Pout_{t-T} \qquad \text{Equation X}$$

where $Pout_t$ is the power output at time t and $Pout_{t-T}$ is the power output at prior time t−T.

10. The method of claim 9, wherein calculating the flicker impact of the power change ΔP of the power generating system uses the following Equation XI:

$$F_i = \frac{1}{DPH\left(\frac{abs(\Delta P)}{M_S} * V_d\right)} \qquad \text{Equation XI}$$

where DPH(x) is a number of voltage dips per hour that are allowed based on a percent voltage dip as determined by ΔP, $M_s$ and $V_d$ to stay within the borderline of visibility for voltage flicker as determined from the voltage flicker tolerance curve stored in the controller.

11. The method of claim 9, wherein determining if the flicker impact of the power change ΔP of the power generating system causes the power generating system to exceed the flicker limit is performed by determining if Equation XII is false:

$$F_{i_t} + \sum_{t=t-1\,hr}^{t=t-1} F_{i_t} < 1 \qquad \text{Equation XII}$$

where the left side of Equation XII adds the flicker impact of the power change ΔP of the power generating system to the flicker impacts of all other power changes of the power generating system that occurred in the hour previous to time t.

12. The method of claim 9, wherein:
calculating the flicker impact of the power change ΔP of the power generating system uses the following Equation XIII.

$$F_i = \frac{1}{DPH\left(\frac{abs(\Delta P)}{M_S} * V_d\right)} \qquad \text{Equation XIII}$$

where DPH(x) is a number of voltage dips per hour that are allowed based on a percent voltage dip as determined by ΔP, $M_s$ and $V_d$ to stay within the borderline of visibility for voltage flicker as determined from the voltage flicker tolerance curve stored in the controller; and determining if the flicker impact of the power change ΔP of the power generating system causes the power generating system to exceed the flicker limit is performed by determining if Equation XIV is false:

$$F_{i_t} + \sum_{t=t-1\,hr}^{t=t-1} F_{i_t} < 1 \qquad \text{Equation XIV}$$

where the left side of Equation XIV adds the flicker impact of the power change ΔP of the power generating system to the flicker impacts of all other power changes of the power generating system that occurred in the hour previous to time t.

13. The method of claim 12, wherein the electrical power system includes an energy storage system, comprising:

passing power generated by the power generating system to the grid if the flicker impact of the power change ΔP of the power generating system does not cause the power generating system to exceed the flicker limit; and storing excess power generated by the power generating system in the energy storage system or interjecting power from the energy storage system into the grid if the flicker impact of the power change ΔP of the power generating system causes the power generating system to exceed the flicker limit.

14. The method of claim 9, wherein the electrical power system includes an energy storage system connected between the power generating system and the power grid, comprising passing power generated by the power generating system to the grid if the flicker impact of the power change ΔP of the power generating system does not cause the power generating system to exceed the flicker limit.

15. The method of claim 9, wherein the electrical power system includes an energy storage system connected between the power generating system and the power grid, comprising storing excess power generated by the power generating system in the energy storage system or interjecting power from the energy storage system into the grid if the flicker impact of the power change ΔP of the power generating system causes the power generating system to exceed the flicker limit.

16. The method of claim 1, wherein the facility is a power dissipating load and the power change ΔP is set by Equation XV:

$$\Delta P = Pin_t - Pin_{t-T} \qquad \text{Equation XV}$$

where $Pin_t$ is the power the load draws from the grid at time t and $Pin_{t-T}$ is the power the load draws from the grid at the prior time t−T.

17. The method of claim 16, wherein calculating the flicker impact of the power change ΔP of the load uses the following Equation XVI:

$$F_i = \frac{1}{DPH\left(\frac{abs(\Delta P)}{M_S} * V_d\right)} \qquad \text{Equation XVI}$$

where DPH(x) is a number of voltage dips per hour that are allowed based on a percent voltage dip as determined by ΔP, $M_s$ and $V_d$ to stay within the borderline of visibility for voltage flicker as determined from the voltage flicker tolerance curve stored in the controller.

18. The method of claim 16, wherein determining if the flicker impact of the power change ΔP of the load causes the load to exceed the flicker limit is performed by determining if Equation XVII is false:

$$F_{i_t} + \sum_{t=t-1\,hr}^{t=t-1} F_{i_t} < 1 \qquad \text{Equation XVII}$$

where the left side of Equation XVII adds the flicker impact of the power change ΔP of the load to the flicker impacts of all other power changes of the load that occurred in the hour previous to time t.

19. The method of claim 16, wherein:
calculating the flicker impact of the power change ΔP of the load uses the following Equation XVIII:

$$F_i = \frac{1}{DPH\left(\frac{\text{abs}(\Delta P)}{M_S} * V_d\right)} \qquad \text{Equation XVIII}$$

where DPH(x) is a number of voltage dips per hour that are allowed based on a percent voltage dip as determined by ΔP, $M_s$ and $V_d$ to stay within the borderline of visibility for voltage flicker as determined from the voltage flicker tolerance curve stored in the controller; and determining if the flicker impact of the power change ΔP of the load causes the load to exceed the flicker limit is performed by determining if Equation XIX is false:

$$F_{i_t} + \sum_{t=t-1\,hr}^{t=t-1} F_{i_t} < 1 \qquad \text{Equation XIX}$$

where the left side of Equation XIX adds the flicker impact of the power change ΔP of the load to the flicker impacts of all other power changes of the load that occurred in the hour previous to time t.

20. The method of claim 16, wherein the electric power system includes an energy storage system, comprising providing power from the energy storage system to the load if the flicker impact of the power change ΔP of the load causes the load to exceed the flicker limit.

\* \* \* \* \*